for moving said traveling carriage, an electromagnetic device on the cleaning machine and a make and break switch for said device, said switch being connected with the motor-operated means for said carriage for operation thereby.

11. In an apparatus of the class described, a clarification basin having an overflow wall, a canal for receiving liquid overflowing said wall and provided with a filtering medium down through which the received liquid must pass, whereby to be filtered, an upwardly extendng passage having communication with said canal below the filtering medium for receiving the filtered effluent, and adjustable means controlling the discharge of the effluent rising in said passage and adapted by its adjustment to control the layer of overflow from the basin into the canal.

12. In apparatus of the class described, a clarification basin having an overflow wall, a waterhead supply through which to admit liquid into the basin, a canal for receiving liquid overflowing said wall and provided with a filtering medium down through which the received liquid must pass, whereby to be filtered, an upwardly extending channel having communication with said canal below the filtering medium for receiving the filtered effluent, and a gate device controlling the discharge of the effluent rising in said canal, said device being adjustable to vary the level of the discharge with respect to the level of the liquid in said head whereby to vary the quantity of liquid overflowing said wall and which is to be filtered.

13. That method of clarifying sewage liquid which includes maintaining an overflow of the lighter liquid rising in a clarification basin, subjecting the overflow liquid while it moves downwardly from the level of the overflow, to the filtering action of a filtering medium, regulating the downward movement carrying through the filtering operation to maintain thereby a constant level above the filtering medium, subjecting the filtering medium to an agitation operation effected upwardly from the top thereof, and removing the dirty water of agitation from the downflow existent between the filtering medium and the constant level.

WILLIAM C. LAUGHLIN.
ABRAHAM B. ASCH.

Oct. 2, 1934.　　　F. I. LOUCKES　　　1,975,110
WIRE TIE
Filed Aug. 9, 1933　　　2 Sheets-Sheet 1
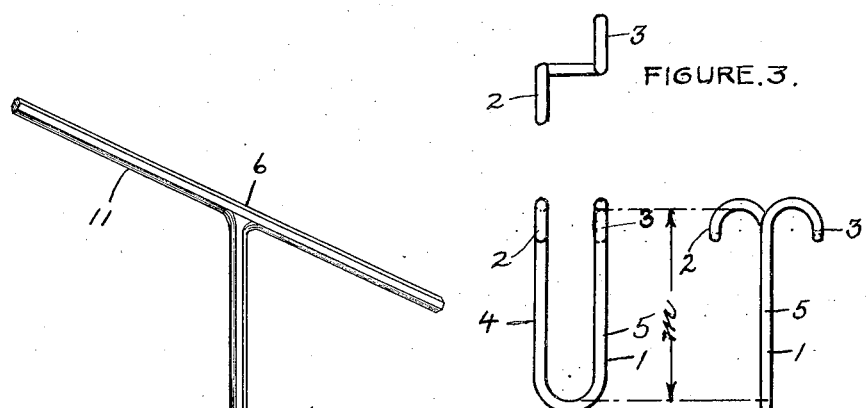
FIGURE 3.
FIGURE 1　　FIGURE 2.
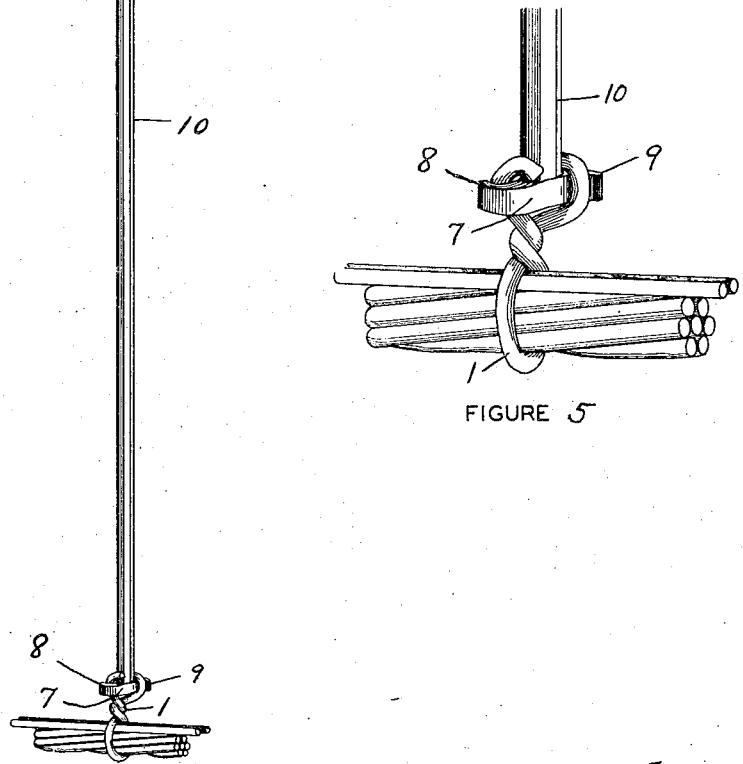
FIGURE 5
FIGURE 4
Inventor
Frank I. Louckes
By
Attorney Oct. 2, 1934.  F. I. LOUCKES  1,975,110
WIRE TIE
Filed Aug. 9, 1933   2 Sheets-Sheet 2
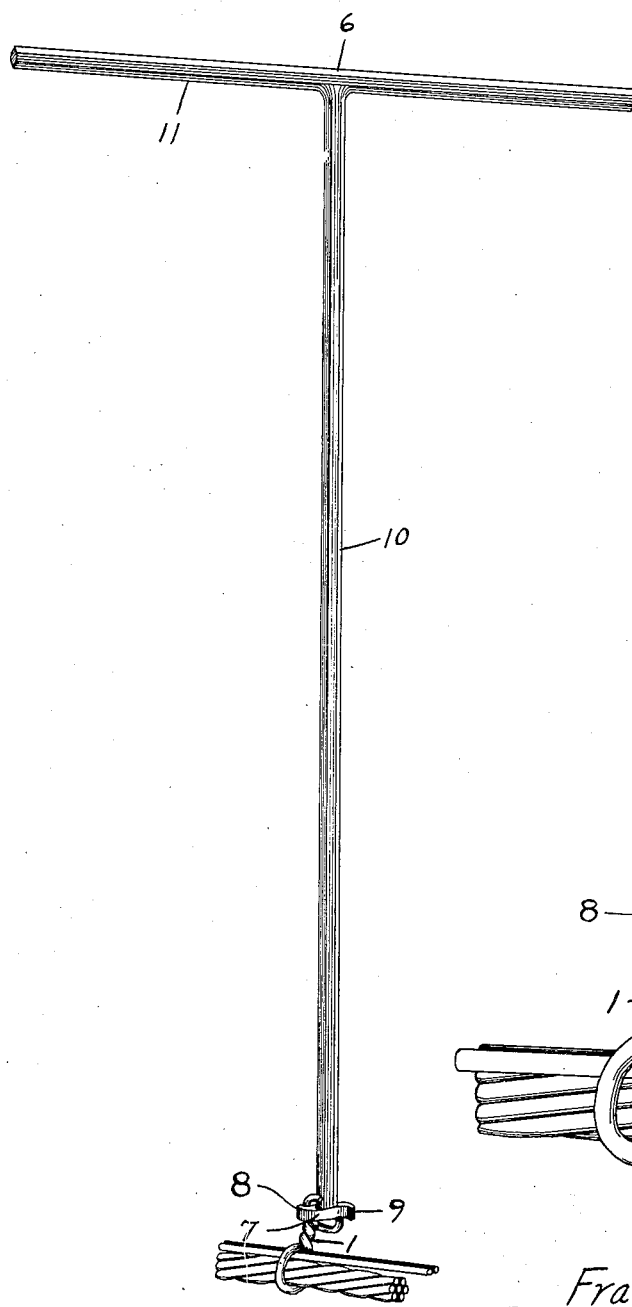
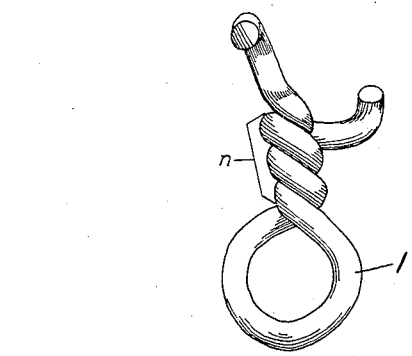
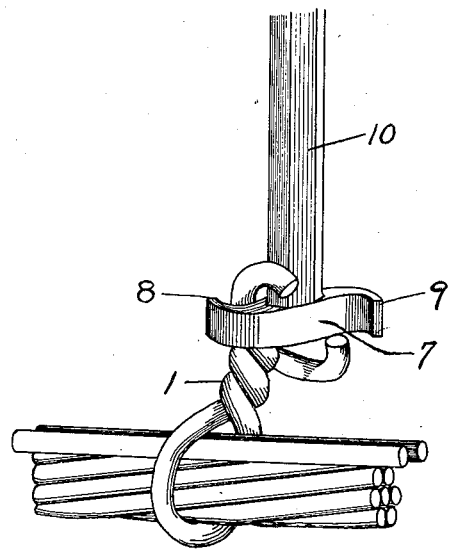
FIGURE 8
FIGURE 7
FIGURE 6
Inventor
Frank I. Louckes
By
Attorney